May 4, 1965
W. E. LANHAM
3,181,292
CONVEYOR BELTS
Original Filed Dec. 21, 1956
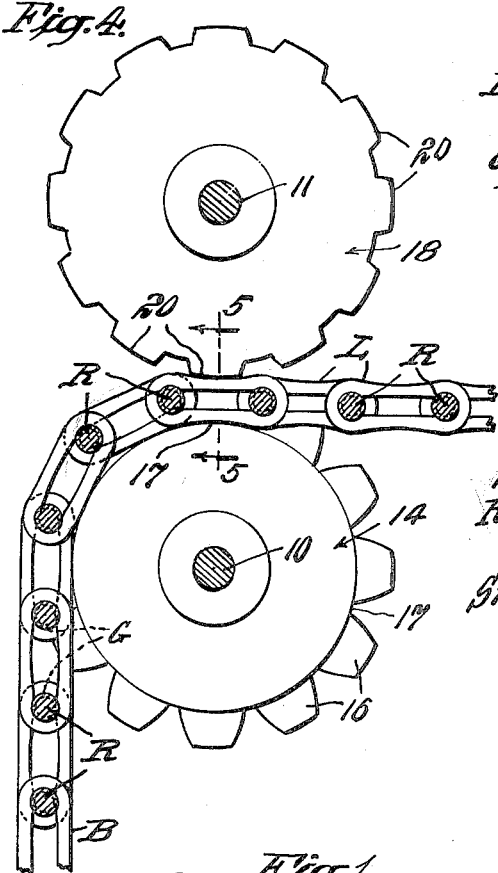
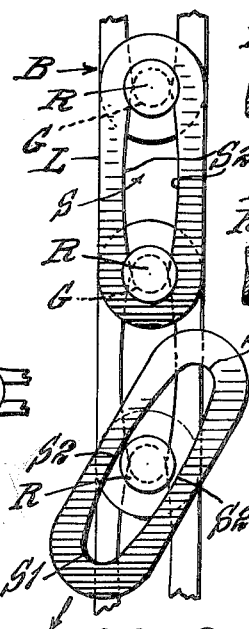
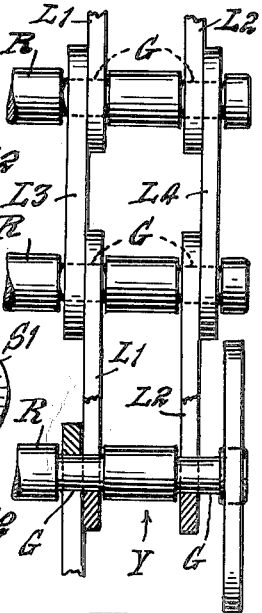
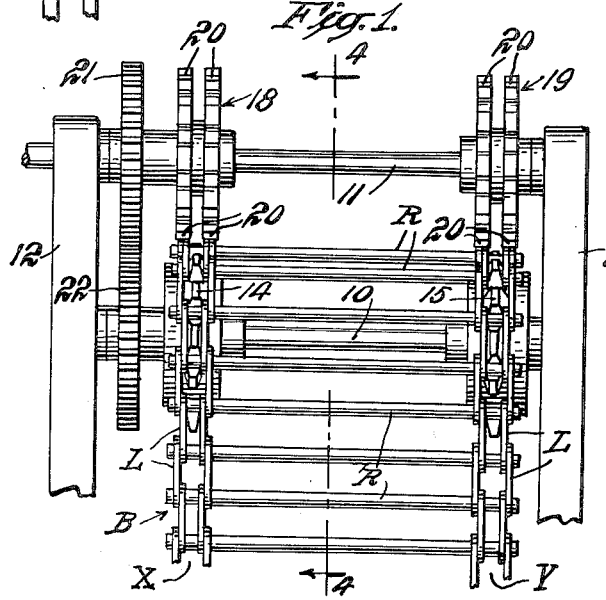
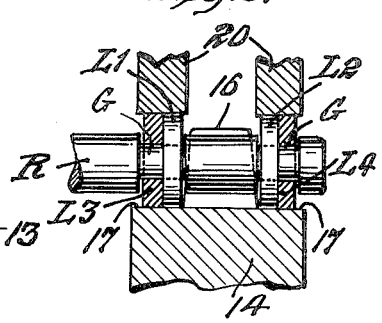
INVENTOR.
WILLIAM E. LANHAM
BY
Curtis, Morris & Safford
his ATTORNEYS

3,181,292
CONVEYOR BELTS
William E. Lanham, 1604 Jonesboro Road SE.,
Atlanta 15, Ga.
Original application Dec. 21, 1956, Ser. No. 629,861.
Divided and this application Nov. 13, 1961, Ser. No.
155,880
3 Claims. (Cl. 59—1)

The present invention relates to an apparatus for fabricating a conveyor belt and is a division of application Serial No. 629,861, filed December 21, 1956, now abandoned, which in turn is a continuation-in-part of my prior application Serial No. 497,521, filed March 29, 1955 and entitled "Conveyor Belt," now abandoned.

The introduction of continuous conveyor belt systems in food manufacturing plants constituted one of the more important advances in the large scale factory production of food. In manufacturing plants where food previously had been processed in discontinuous operations or steps, the use of conveyor belts made it possible to handle the food in one continuous operation with great savings of time and expense and much less danger of contamination and spoilage. Moreover, the final products were improved in quality and uniformity.

In certain food industries the benefit derived from using conveyor belt systems was even more marked than in others. Bakeries, for example, had long been tied to batch production because of the special requirements for bread products. Bread dough appeared to demand a certain amount of aging under exacting conditions, baking for the desired length of time at the right temperature, and finally, after baking, the cooling of the baked bread in a carefully controlled atmosphere to permit the loaves to be wrapped for later distribution to consumers.

Whereas, the cooling of the baked loaves formerly required a great deal of space in the already crowded bakery and a large number of men to service the cooling operations, it is possible for a single conveyor system to free this space and the men for other uses and to give better service at the same time. Previously inaccessible space in the bakery, such as the space near the ceilings, can be utilized with great efficiency by a conveyor belt. Moreover, by making the belt long enough, the bread can be cooled sufficiently to permit wrapping after being moved along the belt from the ovens to a wrapping station. This makes possible the continuous operation of the ovens and the wrapping machines and far more efficient utilization of this equipment and the bakery staff.

Conveyor belts for this type of service are preferably of open construction, such as a link type belt as distinguished from a rubber or other kind of flexible sheet belt, to facilitate even cooling of the bread. Moreover, with the belt open, crumbs and the like which would otherwise accumulate are able to fall through the belt and out of the path of the bread. Sanitation, so essential in the handling of food products, is thus promoted. Although conveyor belts used in bakeries must extend for great lengths and be able to carry sizable loads, they must be adaptable for various paths of movement to take full advantage of the otherwise wasted space.

The conveyor belt made in accordance with the present invention comprises transverse metal rods held together at their ends by links so arranged in rows as to provide a continuous chain at each side of the conveyor belt. These chains may be engaged directly by sprocket wheels thereby making possible very efficient driving of the belt, but also they permit the belt to be driven around relatively sharp corners and at almost any desired upward or downward inclination. The belt is constructed so that it needs only a minimum of lubrication and maintenance and this, coupled with the low initial cost of the belt, results in substantial saving of money. Moreover, because of the relative ease of cleaning the parallel rods of the belt, even the strictest sanitary codes and practices are satisfied.

One of the objects of the present invention is to provide a method of and apparatus for fabricating a conveyor belt of the type indicated which facilitates the assembly of its parts to provide a continuous belt of any desired length. Another object is to provide a method of and apparatus for fabricating a conveyor belt of the type indicated which will not kink or bind during use.

Another object is to provide a method of and apparatus for fabricating a conveyor belt of the type indicated which forms the links with extreme accuracy so that all of the links will pull evenly to provide an equal distribution of load and wear without any lateral bending on the links.

Another object is to provide a method of fabricating the links of a conveyor belt of the type indicated which reduces scrap to a minimum.

Still another object is to provide an apparatus of the type indicated which is of simple and compact construction, economical to manufacture and adapted for operation at high speed.

These and other objects will become more apparent from the following description and drawings in which like characters denote like parts throughout the several views. It is to be expressly understood, however, that the steps of the method as described herein and the apparatus illustrated in the drawings are for the purpose of describing and illustrating one embodiment of the invention and are not definitions of the limits of the invention, reference being had for this purpose to the appended claims.

In the drawings:

FIGURE 1 is a front elevational view of an apparatus for carrying out the steps of the method of the present invention and showing the parallel rows of links assembled on the rods at each end thereof;

FIGURE 2 is an enlarged side elevational view of an assembled chain of rods and links and showing a link being assembled on a rod by aligning the wider central portion of its slot with the end of the rod;

FIGURE 3 is a front elevational view partly in section of the rod and link assembly illustrated in FIGURE 2 and showing how a link is slid over the end of the rod longitudinally thereof and into alignment with a groove therein during assembly;

FIGURE 4 is a sectional view taken on line 4—4 of FIGURE 1 to show one of the sprockets for advancing the assembly of rods and links and the rotating anvils for deforming successive links to lock them on the rods; and FIGURE 5 is an enlarged sectional view taken on line 5—5 of FIGURE 4 to further show how the links are deformed by the anvils to lock them in the grooves on the rods.

The conveyor belt fabricated by the method and apparatus of the present invention is illustrated and described in detail in my prior application Serial No. 479,521, referred to above, of which the instant application is a continuation-in-part. The conveyor belt B comprises a plurality of spaced rods R having grooves G adjacent each end of less diameter than the outside diameter of the rods. A pair of flat links L are provided at each end of each rod which extend to the adjacent rods R to form a continuous belt. Each link L has a slot S with rounded end portions S1 which closely fit the peripheries of the grooves G in rods R and sides S2 between the rounded end portions spaced a distance less than the outside diameter of the rods R to lock the links in the grooves.

Each rod R may be formed with a single groove G adjacent each end, but in the illustrated embodiment a pair of spaced grooves G are provided adjacent each end of each rod. A pair of links L is seated in each groove and each link extends to an adjacent rod to provide sprocket races X and Y between the rows of links at each side of the conveyor belt B. The sprocket races X and Y are of a width to receive the teeth of sprocket wheels for driving the belt B. The teeth of the sprocket wheels directly engage the rods R between the spaced grooves, but the driving force is applied to the ends of the links L at each side of the teeth to prevent the rods from bowing between their ends.

When the conveyor belt B is to be used in straight runs, all of the links are of equal length to hold the plurality of rods R in parallel spaced relationship. However, when the conveyor belt B is used in circular runs, the links L of each row are of a different length than the links L in the other rows to adapt the rods R to fan about a central axis, and the lengths of the links in the different rows determines the radius of the path of the belt.

The method of the present invention in one aspect comprises the steps of forming the flat links with slots of a width to slide over the ends of the rods, assembling a pair of links in each slot S in each rod R which extend to corresponding slots in adjacent rods, and deforming each link L by compression to lock the links in the slots. The slots S in the links L are formed with rounded ends S1 of a diameter less than the outside diameter of the rods R to snugly fit the outer periphery of the grooved portions G of the rods. The sides S2 of the slots S diverge from the rounded ends S to provide intermediate portions of a width greater than the outside diameter of the rods to adapt the links to be slid laterally over the ends of the rods into alignment with the grooves G. While the slots S may have other shapes, in the illustrated embodiment they are made oval.

The links L may be punched from sheet stock and material may be punched from the link blanks to form the slots S therein. Thus, the formed links L are flat, comparatively thin and require a minimum space laterally of the conveyor belt B. Preferably, the links are made from rolled strip stock having the same width as the finished link L. The strip stock is rolled to the required thickness and with finished sides of generally rounded contour to eliminate sharp edges. The strip is then cut in lengths corresponding to the lengths of the links L to be formed. In order to provide rounded ends on the links L, the sections of strip are cut on oppositely curved lines to form a link with each punching and reduce scrap to a minimum. Material then is punched from the link blanks to form the slots S. The cutting of the lengths of strip on circular lines and the punching of the slots my be performed simultaneously by a single punching operation. Such a method of forming the links L from roled strip stock reduces cupping or other deformation of the finished links to a minimum and provides accurately dimensioned finished sides for engagement by the deforming anvils.

The rods R and links L are assembled by aligning the wider intermediate portions between the sides S2 of the slots S with the ends of the rods and sliding the links longitudinally of the rods into alignment with the grooves G. Each groove G receives a pair of links L with each link of the pair embracing the end of one or the other of the next adjacent rods. Thus, the links L are assembled in parallel rows at each side of the conveyor in continuous chains.

After assembling the links L on the rods R, the sides of the links are compressed between anvils to lock the links L in the grooves G in the rods R. To this end, the assembled chain of rods R and links L are advanced and the anvils actuated in timed relation to the movement of assembly to engage the opposite, finished parallel sides of each link at the same place and thereby deform each link by the same amount. Preferably, the rods R and links L are continuously assembled in successive sections and the links deformed by rotating anvils which engage successive links at the same intermediate point as the assembly is advanced by sprocket wheels operating in the races X and Y. The anvils rotate about fixed axes so as to compress the sides of the links L toward each other and thereby compress the sides S2 of slots S into substantially parallel relationship with a space therebetween less than the outside diameter of the rods R and greater than the diameter of the grooves G. Thus, each link L is deformed at the same place and to the same degree so that the distance between the curved ends S1 of the slot S will be the same in all of the links. In some instances the anvils are so arranged as to deform the links L to different degrees in the different rows to adapt all of the links to pull equally as for example when the conveyor belt B is to be used on a circular run.

The rods R and the links L are preferably made of steel having different compositions with complementary bearing characteristics to reduce friction and wear to a minimum. As one example, rods of .1875 inch diameter are composed of C1114, AISI standard, and the links of .0747 inch thickness are composed of C1020, AISI standard. After the rods R and links L have been assembled and the links compressed to lock them on the rods, the end portions of the rods and links are heat treated at a temperature of 1500° F. in the presence of carbonizing salt for a sufficient period of time, for example 15 minutes to carbonize the links throughout to a brittle hardness and produce a surface hardness only on the rods R to 89–91 points on the Rockwell "N" scale. The two steel alloys referred to above are particularly adapted for such heat treatment. Thus, any misalignment of the belt B which would tend to produce lateral bending of the links will cause the links to snap and break indicating that the belt B is not functioning properly. After the fault is corrected, the snapped link may be replaced and deformed to lock it on the rods R.

One form of apparatus is ilustrated in the drawings for facilitating the assembly of the links L on the rods R and deforming the links in accordance with applicants method. The apparatus comprises a pair of shafts 10 and 11 mounted in spaced arms 12 and 13 of a frame. Shafts 10 and 11 are mounted in universal bearing blocks slidable in slots in the frame arms 12 and 13 to adapt the shafts to be adjusted toward and away from each other in parallel relationship or angularly to each other. Shaft 10 mounts a pair of sprocket wheels 14 and 15 spaced a distance equal to the spacing of the sprocket races X and Y of the conveyor belt B to be formed. The sprocket wheels 14 and 15 are adjustable laterally on the shafts 10 and 11 to adapt them for belt B of any desired width.

Each sprocket wheel 14 and 15 has peripheral teeth 16 of a length to fit closely between the rods R to hold them spaced and of a width to fit between adjacent links L. Projecting laterally from each side of the teeth 16 of each sprocket wheel 14 and 15 are cylindrical hub portions constituting anvils 17 which underlie one side of the links L of each row. Each cylindrical anvil 17 is of a diameter relative to the root diameter of its sprocket teeth to cause a flat side of each link L to lie on the periphery of the cylindrical anvil tangentially as it is advanced by the teeth 16 of the sprocket wheel.

A pair of cooperating anvil wheels 18 and 19 are mounted for lateral adjustment on and rotation with shaft 11. Each anvil wheel 18 and 19 has spaced projecting anvils 20 with the anvils in each row angularly spaced a distance equal to the spacing between adjacent links L. Shaft 11 is driven from any suitable source of power and shafts 10 and 11 are connected by intermeshing gear wheels 21 and 22 for rotating the angularly spaced projecting anvils 20 in timed relation with the teeth 16 on the sprocket wheels 14 and 15. The sprocket wheels 14 and 15 are so arranged with respect to the angularly spaced anvils 20 on the rotating wheels 18 and 19 that the spaced projections will engage the same intermediate portion of successive links L. The space between the periphery of the anvils 17 and 20 is so dimensioned as to compress or indent the opposite parallel sides of the links L a predetermined fixed distance inwardly toward each other. Usually, the spacing between the anvils 17 and 20 is such as to compress the opposite sides S2 of the slots S in the links L into parallel relationship to lock the links on the rods R. In some instances it may be desirable to compress the links to a greater degree and in other instances it may be desirable to compress the links to a lesser degree depending upon the particular kind of conveyor belt to be produced. For this purpose interchangeable rotating anvil wheels 18 and 19 are provided to produce the particular compression of the links desired.

When a chain is to be fabricated in accordance with the present invention, a pair of links L for each groove G are mounted on a rod R by aligning the wide central portion of the link slots S with the end of the rod as illustrated in FIG. 2 and sliding the links longitudinally of the rod until they align with a groove as illustrated in FIG. 3. Rod R with four pairs of links L thereon in alignment with the grooves G is then mounted on the sprocket wheels 14 and 15 with a tooth 16 of each wheel positioned between the pairs of links at each end of the rod. As observed by reference to FIG. 3, the inner adjacent links L1 and L2 at each end are projected upwardly and the outer pair of links L3 and L4 at each end depend or hang down from the rod R. One end of a second rod R is then slid longitudinally through the enlarged portion S2 of the slot S in link L3 and through a pair of additional links L1 and L2 and then through the link L4. The second rod R is then slid longitudinally in a reverse direction through the depending link L3 at the opposite end, through two additional links L1 and L2 and the depending link L4 until a pair of links align with each of the grooves. The second rod R is then released and hangs from the first rod. Rods R and links L are assembled successively in the manner described above to provide a continuous chain depending from the sprocket wheels 14 and 15. The depending chain of rods R and links L provide the tension required to hold the pairs of links in the grooves G and a working end which facilitates assembly of successive rods and links.

Operation of the apparatus is then initiated by starting a motor or otherwise connecting shaft 11 to a prime mover. Rotation of shaft 11 is transmitted through gears 21 and 22 to rotate shaft 10 and thereby rotate the opposed sprocket wheels 14 and 15 and the anvil wheels 18 and 19 in opposite directions. The teeth 16 of the rotating sprocket wheels 14 and 15 advance the assembly and move the rows of links L between the rotating anvils 17 projecting laterally from each side of the teeth on the sprocket wheels and the cooperating anvils 20 on the anvil wheels 18 and 19. As illustrated in FIG. 4, one of the anvil projections 20 on the rotatable anvil wheel 18 will engage one side of a link L at a point intermediate its ends at the same time that anvil 17 engages a corresponding point at the opposite side of the link to compress and deform the sides 17 inwardly toward each other to lock the links L on the rods R.

As the sprocket wheels 14 and 15 advance the assembly, the series of projecting anvils 20 on the rotating anvil wheels 18 and 19 will compress successive links L in each row of links equal amounts in a controlled manner to form links of the same length between their rounded ends S. As the rotating anvils 17 and 20 successively compress and deform the plurality of links L as they are advanced by the sprocket teeth 16, an operator assembles additional links L and rods R at the lower end of the depending chain. The shafts 10 and 11 may be continuously rotated or may be rotated under the control of the operator.

When the conveyor belt is to be used on horizontal circular runs, the links L in successive rows are made progressively shorter so that the rods R may fan outwardly about a fixed axis. The rods R and links L are assembled in the same manner as previously explained, but suitable sprocket wheels 14 and 15 and anvil wheels 18 and 19 to accommodate the shorter links L are substituted. Shafts 10 and 11 also are adjusted angularly to accomodate the lesser wheel circumference. In some instances, the same links L may be used in the different rows at the same side of the belt B and the links in the different rows deformed by the anvils 17 and 20 to a greater and lesser degree to produce the required difference in length. Thus, the anvils 17 and 20 provide an accurate control of the length of the links L.

While the method and one embodiment of apparatus for carrying out the steps of the method are herein described and illustrated, it will be understood that changes may be made in the steps of the method and in the form of the apparatus without departing from the spirit or scope of the invention. Therefore, without limitation in this respect, the invention is defined by the following claims:

I claim:

1. Apparatus for fabricating conveyor belts by deforming links assembled on and extending between grooves in the ends of adjacent rods comprising a rotatable shaft, sprocket wheels mounted on the shaft in spaced relation thereon and having radially projecting teeth of a length to closely fit between adjacent rods at one side of the links to position adjacent rods at the ends of the links at each end thereof, a hub projecting laterally from at least one side of each sprocket wheel to underlie the links and constituting anvils at one side of the links, a second rotatable shaft mounted in parallel relation to the first mentioned shaft, anvil wheels mounted in spaced relation on said second shaft with each anvil wheel cooperating with a corresponding sprocket wheel, each of said anvil wheels having spaced radially projecting anvil teeth in alignment with and overlying the hub projecting laterally from its corresponding sprocket wheel, the end of each anvil tooth being spaced from the periphery of its corresponding hub a distance to engage and deform a link therebetween and produce a parallel relation of the inner edges of the link to lock the link in the grooves in the rods, said anvil teeth on each anvil wheel being of an arcuate length to engage successive links centrally thereof and spaced from each other to disengage the end portions of the links surrounding a rod, gears connecting said shafts to deform successive links as they pass bewteen the hub and anvil teeth on the sprocket and anvil wheels, and means for driving at least one of said shafts.

2. Apparatus in accordance with claim 1 in which each sprocket wheel has hubs projecting from the opposite sides thereof, and each anvil wheel has spaced rows of teeth located at opposite sides of the radially projecting teeth on its corresponding sprocket wheel and aligned with and overlying the hubs on the sprocket wheel whereby to deform and lock pairs of spaced links at each end of the rods.

3. Apparatus in accordance with claim 1 in which the hubs and teeth on each sprocket wheel and cooperating anvil wheel, respectively, extend axially of the shafts on which they are mounted a distance to overlie two links arranged in side by side relationship.

References Cited by the Examiner

UNITED STATES PATENTS

| | | | |
|---|---|---|---|
| 804,799 | 11/05 | Edison | 153—28 |
| 1,748,978 | 3/30 | Feeney | 153—28 |
| 1,810,724 | 6/31 | Parker | 59—6 |
| 1,833,616 | 11/31 | Nelson et al. | 153—28 |
| 1,899,948 | 3/33 | Fahrenwald | 59—5 |

MICHAEL V. BRINDISI, *Primary Examiner.*

HUNTER C. BOURNE, JR., *Examiner.*